(12) United States Patent
Hill et al.

(10) Patent No.: US 10,303,801 B2
(45) Date of Patent: May 28, 2019

(54) VISUAL MEME TRACKING FOR SOCIAL MEDIA ANALYSIS

(71) Applicant: INTERNATIONAL BUSINESS MACHINES CORPORATION, Armonk, NY (US)

(72) Inventors: Matthew L. Hill, Yonkers, NY (US); John R. Kender, Leonia, NJ (US); Apostol I. Natsev, Harrison, NY (US); John R. Smith, New York, NY (US); Lexing Xie, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/390,239

(22) Filed: Dec. 23, 2016

(65) Prior Publication Data

US 2017/0109360 A1    Apr. 20, 2017

Related U.S. Application Data

(63) Continuation of application No. 12/909,137, filed on Oct. 21, 2010, now Pat. No. 9,552,442.

(51) Int. Cl.
*G06F 7/00* (2006.01)
*G06F 17/30* (2006.01)

(52) U.S. Cl.
CPC .... *G06F 17/3079* (2013.01); *G06F 17/30017* (2013.01); *G06F 17/30781* (2013.01); *G06F 17/30867* (2013.01); *G06F 17/30958* (2013.01); *G06F 17/30964* (2013.01)

(58) Field of Classification Search
CPC ......... G06F 17/30964; G06F 17/30781; G06F 17/30017; G06T 2207/00
See application file for complete search history.

(56) References Cited

U.S. PATENT DOCUMENTS

| | | | | |
|---|---|---|---|---|
| 5,893,095 A | * | 4/1999 | Jain | G06F 17/30256 |
| 6,430,312 B1 | * | 8/2002 | Huang | G06F 17/3025 382/162 |
| 8,094,872 B1 | * | 1/2012 | Yagnik | G06K 9/00711 380/201 |
| 2005/0084154 A1 | * | 4/2005 | Li | G06K 9/4652 382/190 |
| 2008/0307326 A1 | * | 12/2008 | Gruhl | G06F 17/30867 715/753 |
| 2010/0088726 A1 | * | 4/2010 | Curtis | G11B 27/034 725/45 |

OTHER PUBLICATIONS

Leskovec et al. "Meme-tracking and the Dynamics of the News Cycle." KDD '09. 9 pages.*

(Continued)

*Primary Examiner* — Charles E Lu
(74) *Attorney, Agent, or Firm* — Tutunjian & Bitetto, P.C.; Rahan Uddin (57) ABSTRACT

A system and method for analyzing visual memes includes identifying visual memes associated with at least one topic in a data source. The visual memes propagated over time are tracked to extract information associated with identified visual memes. The information associated with the visual memes is analyzed to determine at least one of generation, propagation, and use of the identified memes.

20 Claims, 9 Drawing Sheets

(56) References Cited

OTHER PUBLICATIONS

"Memes: The Infographic." Online. http://www.buzzfeed.com/awesomer/memes-the-infographic. Aug. 28, 2010. 10 pages.*
Lim, Joo-Hwee. "Learnable Visual Keywords for Image Classification." ACM (c) 1999. 7 pages.*
Ichiro et al. "Genre-Adaptive Near-Duplicate Video Segment Detection." (c) 2007 IEEE. 4 pages.*
Liu et al. "Clustering Billions of Images with Large Scale Nearest Neighbor Search." (c) 2007 IEEE. 6 pages.*
Nitin Agarwal et al. "Identifying the Influential Bloggers in a Community." ACM (c) 2008. 11 pages.*
Stephan Raaijmakers et al. "Multimodal Topic Segmentation and Classification of News Video." IEEE (c) 2002. 4 pages.*
K. Rajaraman et al. "Topic Detection, Tracking, and Trend Analysis using Self Organizing Neural Networks." Advances in Knowledge Discovery and Data Mining vol. 2035, pp. 102-107, (c) 2001.*
Pan et al. "Automatic Multimedia Cross-modal Correlation Discovery." KDD '04, Aug. 22-25, 2004. 6 pages.*

* cited by examiner

VISUAL MEME TRACKING FOR SOCIAL MEDIA ANALYSIS

BACKGROUND

Technical Field

The present invention relates to video content analysis, and more particularly to systems and methods for tracking duplicated video in social media and other environments.

Description of the Related Art

Real-world events leave a significant trace on news and social media, creating buzz, e.g., large amounts of activity openly accessible online. This buzz may be on almost any subject. Ease of publishing and sharing seem to outpace even the rapid progress of modern search engines, collaborative tagging and content aggregation services. This leaves users seeing only small portions for their topics of interest. Buzz overload becomes a problem and is particularly prominent for linear media (e.g., audio, video, animations), where at-a-glance impressions are hard to get and often unreliable.

One of the long-standing challenges in media analysis and applications research is to be able to capture a large amount of content for any topic, and then characterize a repository accordingly. Such a system can be useful in many different domains, such as brand and image monitoring, event spotting, trend prediction, better retrieval for both videos and their creators, or even better sampling, storage and transmission systems.

SUMMARY

A system and method for analyzing visual memes includes identifying visual memes associated with at least one topic in a data source. The visual memes propagated over time are tracked to extract information associated with identified visual memes. The information associated with the visual memes is analyzed to determine at least one of generation, propagation, and use of the identified memes.

A system in accordance with the present principles includes a processor and a memory coupled to the processor. The memory stores an analysis module configured to identify and track visual memes associated with at least one topic in a data source. The analysis module further includes a tracking module configured to collect information associated with identified visual memes as the visual memes are propagated over time and a trend determination module configured to discover trends by analyzing the information associated with the visual meme to determine at least one of generation, propagation, and use of the identified memes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

In accordance with the present principles, visual memes are employed for analyzing video buzz. A meme is a cultural unit (e.g., an idea, value, or pattern of behavior) that is passed from one person to another in social settings. For video analysis in a social network, in particular, a visual meme is a short segment of video that gets remixed and reposted openly, e.g., frequently reposted keyframes of video shots. Visual memes in social media buzz are massively duplicated visual snippets in videos and images, such as a memorable video clip or a canonical photo. Making original visual content such as images and videos needs significant effort and time commitment from an author/producer. Posting a video meme may be considered a deeper stamp of approval (or may imply higher awareness) than, leaving a comment, giving a high rating, or sending a twitter on the same subject.

Large amounts of massively-duplicated memes may lead to determinations such as how the memes are produced, how many memes there are, who produces the memes, and what do the memes mean for their original creators and disseminators. In accordance with the present embodiments, several steps are provided towards determining whether sense can be made for an event and its associated social network from the memes. A large-scale content acquisition system is developed and deployed using generic text queries as a pre-filter for content creation on a given topic. Then, meme (a.k.a., near-duplicate images and video) detection is performed on many videos (e.g., tens of thousands of videos) and more (e.g., millions) video shots and images. A meme can be regarded as either a visual word that expresses meaning in multimedia documents, or a link between the content the meme is from and the people who created the meme.

The present embodiments can be implemented on a large-scale, and provide event-based social video monitoring and visual content analysis. Visual memes are employed as a tool to characterize on-topic video content, and implement a scalable system that can extract all memes from, e.g., over 1 million images in just a few hours on a single CPU. A dual model of memes for both network and collection analysis are provided. A new cross-modal-matching (CM²) method is provided for annotating memes and illustrating words.

Empirical analysis may be performed on several large-scale event datasets to provide insights. For example, in one illustrative case, between 50%~70% of the videos in an event collection may not be original. Memes can be reposted within an hour or less of their appearance. In one example, over 70% are duplicated in the first day, and a large portion tends to resurge after a week or longer. There are apparent content originators and disseminators in a community, measured by a diffusion influence index on memes. The role of transitional news media and citizen journalists vary from event to event, and can also be measured quantitatively, among other things.

The present embodiments may be employed for applications such as brand monitoring, social buzz tracking, event spotting, ranking content and people by influence, among others. In particularly useful embodiments, two systems were constructed as a foundation of a monitoring method and an application. These included a large-scale event-based social video collection and monitoring system, and a scalable method for extracting visual memes with high accuracy. Visual memes were modeled from two perspectives: as links in people-content networks and as words in multimedia collections. The visual memes, or frequently reposted short video segments, were employed for tracking and monitoring real-world events in social media.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++, python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
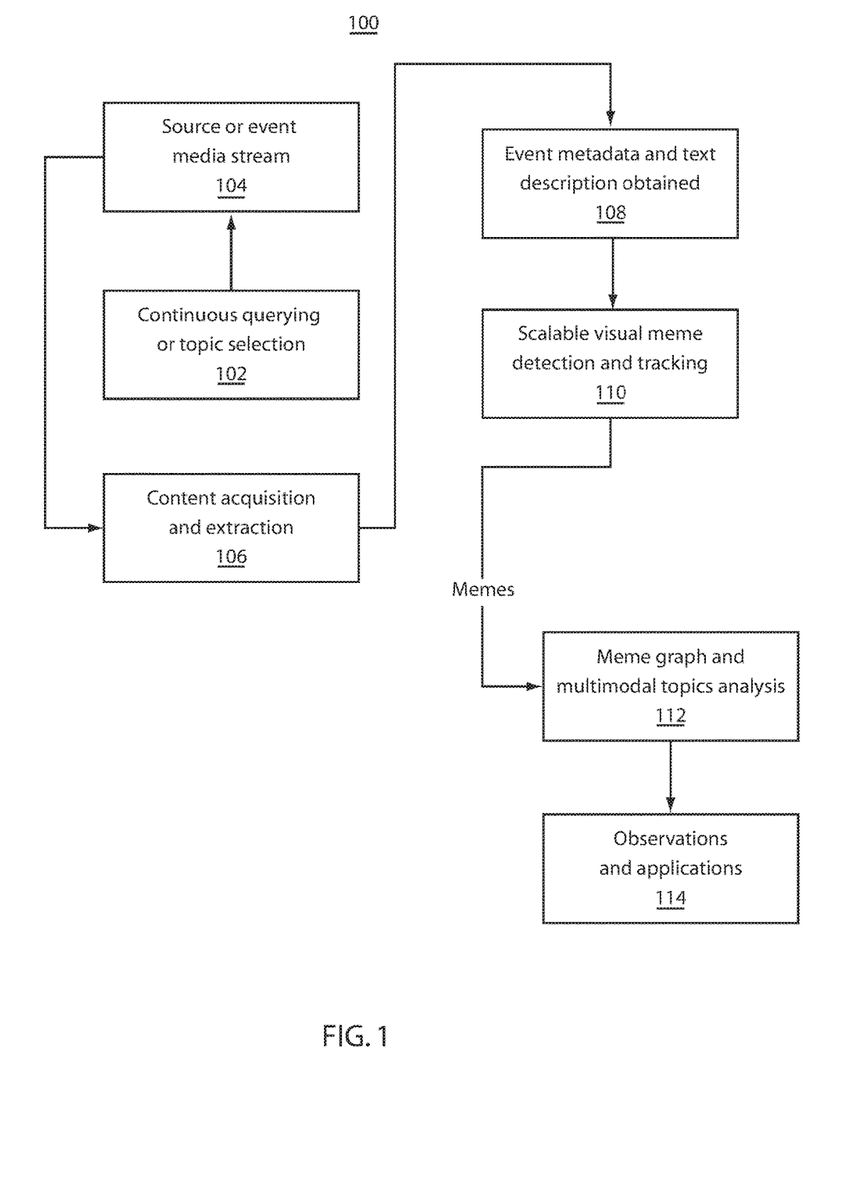
FIG. 1 is a block/flow diagram showing a system/method for tracking and analysis of visual memes in social event streams in accordance with one illustrative embodiment.

Referring now to the drawings in which like numerals represent the same or similar elements and initially to FIG. 1, a system/method for tracking and analyzing visual memes is illustratively shown. In this example, image and video memes are represented in a static keyframe format or dynamic video clip format. Visual memes are frequently re-posted images or video segments, in a variety of appearances including resolutions, formats, background, caption overlays, etc. Despite lots of variations in the videos that contain the visual memes (such as size, coloring, caption, editing, etc.), each meme instance is semantically consistent, and they often become iconic representations of the events from which they are produced.

For repositories, content hosting sites and sharing web sites (e.g., YouTube™, Metacafe™, etc.), video content of almost every type may be provided. Monitoring all content is infeasible, therefore, a given topic or set of topics may be employed to narrow the field. In block 102, constant querying of event media streams 104 may be performed. For example, "global warming" could be a topic to consider. Then, text queries may be constructed, such as, e.g., global warming, climate change, $CO_2$ emission, etc., and these videos are collected from a video source in block 106, such as a repository or website (e.g., YouTube™, Metacafe™, etc.). For each video entry, a number of structured and semi-structured metadata fields are obtained, in block 108, including the author and date on which this video was published/uploaded. Many returned videos from such generic text queries may not be relevant to the topic, but by identifying visual memes in block 110 and performing analyses, such as author influence scoring (or other analysis), in block 112, highly relevant videos can be identified, and the evolution of the topic can be tracked. In block 114, observations and applications may be performed using the information obtained in the tracking and analysis.

In accordance with one embodiment, a social network measurement study is performed using system 100. Random, or category-specific, content acquisition characterizes the entire social network and observes collective behavior and content distributions. Topic-specific continuous querying in block 102 and monitoring on social streams 104 is performed. Visual memes are employed to reveal implicit or explicit common interest among a large user group. The originators and disseminators are determined using the history of the visual memes.

The visual memes may be employed for tracking and monitoring real-world events. By employing a scalable method for extracting visual memes with high accuracy, trends, events, topics of interest, etc. can be studied in an objective way. In accordance with the present principles, formal models have been developed for leveraging visual meme networks and multi-modal topics. Identification and quantification measurements of influence of video content originators and disseminators in a community can be determined.

Figure 2:
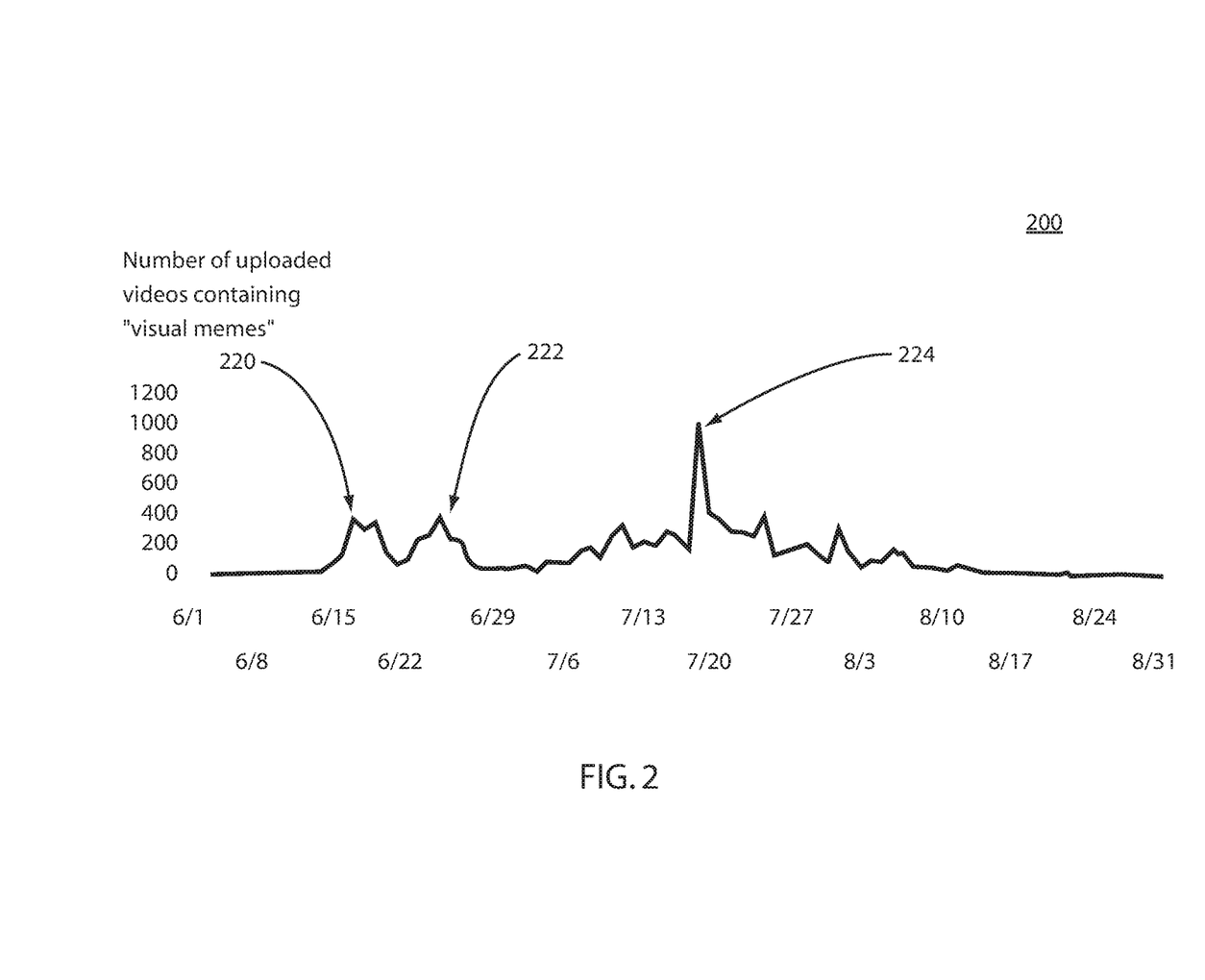
FIG. 2 is a plot showing a volume of memes posted over time

Referring to FIG. 2, a volume of videos acquired, according to their upload date, by a system (100) in accordance with the present principles is illustratively shown in a chart 200. General trends can be seen in the example topic shown. The volume and evolution of meme-videos (that include one or more memes) may also be tracked. The volume of meme videos is very significant, several hundred to more than a thousand per day, and there are three prominent peaks 220, 222 and 224 on the timeline covering June to August. A clear correlation between each peak can be tracked with an important event in the real world, illustrated with a sample of visual memes. For example, the first peak 220 of activity occurs in mid-June after a first event was announced. Another culmination point, peak 222, is reached when another event occurs. A third peak 224 occurs about a month later fro yet another event. Memes may be represented as both clusters and icons, with the clusters being a group of images with various appearances that are near-duplicates (near-dups) of each other.

Referring again to FIG. 1, in block 102, data application programming interface (API) may be employed to query and extract entries (e.g., 1000 or more) for each query. A simple de-duping may be performed against a query history using a hash string or other mechanisms. For each video, shots are segmented, keyframes are extracted and visual features are extracted from each keyframe in block 106. The selection of keyframes and visual features (visual memes) depends upon the accuracy desired, the type of query and any other application specific properties. Also, information may be extracted from the associated metadata in XML, json or other formats, such as author, publish date, view counts, and free text title and descriptions (with stop word removal and stemming) in block 108.

Scalable meme detection is performed in block 110. Visual memes are frequently reposted video segments or images, and they are quite common due to the nature of visual content. It is much harder to generate original visual content as compared to text, for example. Users therefore frequently repost content by others, usually with little or no intentional editing, but with the intention to promote the content or to express their own views. Re-posting is a much stronger endorsement than simply viewing, commenting on, or linking to the content. Identifying the most re-posted bits of visual content can therefore be a very strong indicator of the content's "interestingness", more so than the content view count, which can be quite non-indicative of relevance. Therefore, the number of times a piece of content is reposted may be employed as a way of identifying interesting content.

Since duplication occurs at the level of video shots, rather than entire videos, it is necessary to look for matches at the shot level. Even if the analysis is restricted to videos related to a single topic only, we still may have millions of shots generated from topic monitoring over relatively short time periods. The approach of comparing every shot's keyframe to every other keyframe has a complexity of $O(N^2)$, where N is the number of keyframes. Instead, an approximate nearest-neighbor search may be employed, which runs roughly in $O(N\sqrt{N})$ time, followed by a linear-time set merge operation to compute the near-duplicate equivalence classes. So, potential misses are permitted but not false alarms during the frame near-duplicate queries, and the potential misses are compensated for by performing transitive closure on pairs of identified keyframe near-duplicate matches.

In one embodiment, a frame similarity metric is based on a color correlogram, which captures the local spatial correlation of pairs of colors, and is a second-order statistic on the color distribution. The color correlogram is rotation-, scale-, and to some extent, viewpoint-invariant. A "cross"-layout formulation of the correlogram may be adopted which extracts a descriptor from horizontal and vertical central image stripes, emphasizing the center portion of the image and disregarding the corners. The cross formulation improves robustness with respect to text/logo overlay, borders, crops and shifts, etc. An auto correlogram is extracted in a 166-dimensional perceptually quantized hue, saturation, value (HSV) color space, resulting in, e.g., a 332-dimensional overall descriptor length. Prior to extracting the correlogram descriptor, we normalize frames by detecting and removing borders, normalizing aspect ratio, performing de-noising, and a contrast-limited histogram equalization to normalize contrast and gamma. We also remove frames with low entropy to avoid trivial duplicate matches.

Once descriptors are extracted for all keyframes, they are indexed for a fast k-nearest neighbor (k-NN) lookup. Fast Library for Approximate Nearest Neighbor (FLANN) may be employed, which automatically selects the best indexing data structure (e.g., a k-means tree, kd-tree, or other methods may be employed) and associated parameters for a given dataset. A maximum number of nodes, m, to be checked is set when doing a nearest-neighbor search, which bounds the query run time to O(m). Running N queries against the entire set of N keyframes can be accomplished in O(Nm) time, where values of m on the order of $\sqrt{N}$ produce approximate k-NN results that have, e.g., over 0.95 precision and 2-3 orders of magnitude speed-up, versus an exact nearest neighbor search.

Query-adaptive thresholding based on the $L_2$ distance of correlogram features was employed to determine near-duplicates. For a given query frame, q, and correlogram feature, $f_q$ we retrieve up to 50 nearest neighbors from the FLANN index, and threshold the list to keep only matches within a distance of $$\frac{|f_q|_2}{|f_{max}|_2}\tau,$$

where $|\cdot|_2$ is the $L_2$ vector norm, $f_{max}$ is the collection max vector, composed of the largest observed coefficients for each dimension, and $\tau$ is a global distance threshold. This permits a threshold based on the information content of a frame to be used, and lowers the effective threshold for frames that are too simple and have sparse correlogram features. The thresholds are tuned on an independent validation dataset.

Given the incomplete set of pairwise near-duplicate matches, transitive closure is performed on the set of pairwise near-duplicate matches to find the equivalence classes of near-duplicate sets. An efficient set union-find method may be employed, which runs in amortized time that is effectively O(E), where E is the number of pairwise edges. Near-duplicate set criteria may be user selected, set as a similarity score threshold, etc. to be able to identify the nearest duplicate images to a subject image.

In block 112, visual meme modeling is performed. In this illustrative example, two complementary views are presented on visual memes to build models for this large-scale media gist in networked social interactions. In one view, memes are treated as links—where videos and people are interacting entities (nodes) in a dynamic network. Each re-posted meme image is an explicit statement of mutual awareness, or a relevance statement on a mutually interested subject, just like hyperlinks on the world-wide web. Here visual memes behave like the RT twitter tags (retweet verbatim) for inferencing relationships between authors. In the other view, we treat visual memes as words, where videos are documents that contain the words, and memes are part of a shared vocabulary that people use around the same event and that visual memes behave like words statistically. The visual meme vocabulary expresses additional concepts not captured in words (text). The memes (visual words) and textual words jointly define the topics and trends in an event, through which summarization, monitoring and exploration are possible. Here, meme phrases are presented as a set of streams flowing over time.

By defining notations to represent the event media stream to facilitate modeling in both views, begin by using notations from the document view, and then adapt the notations to represent the network view. Denote a video as a multimedia document $d_m$ in event collection $\mathcal{D}$, with m=1, ..., M. Each video is authored (uploaded) by a user $a(d_m)$ at time $t(d_m)$, where $a(d_m)$ takes its value from the set of users $\mathcal{A}=\{a_r, r=1, ..., R\}$. Each document $d_m$ includes a collection of words, $\{w_{m1}, w_{m2}, ..., w_{mN_m}\}$, each of which can be textual terms (from the title, description, comments, tags) $w_t$ and visual teams $w_v$, from the respective word- and meme-dictionaries, $\mathcal{V}_t$ and $\mathcal{V}_t$. In the networked view, the nodes include distinct documents $d_m$, m=1, ..., M or individual authors $a_r$, r=1, ..., R, and memes are treated as time-sensitive edges $e_{ij}$ with creation time $t(e_{ij})$, where i,j are over the dimensions of the graph.

Figure 3:
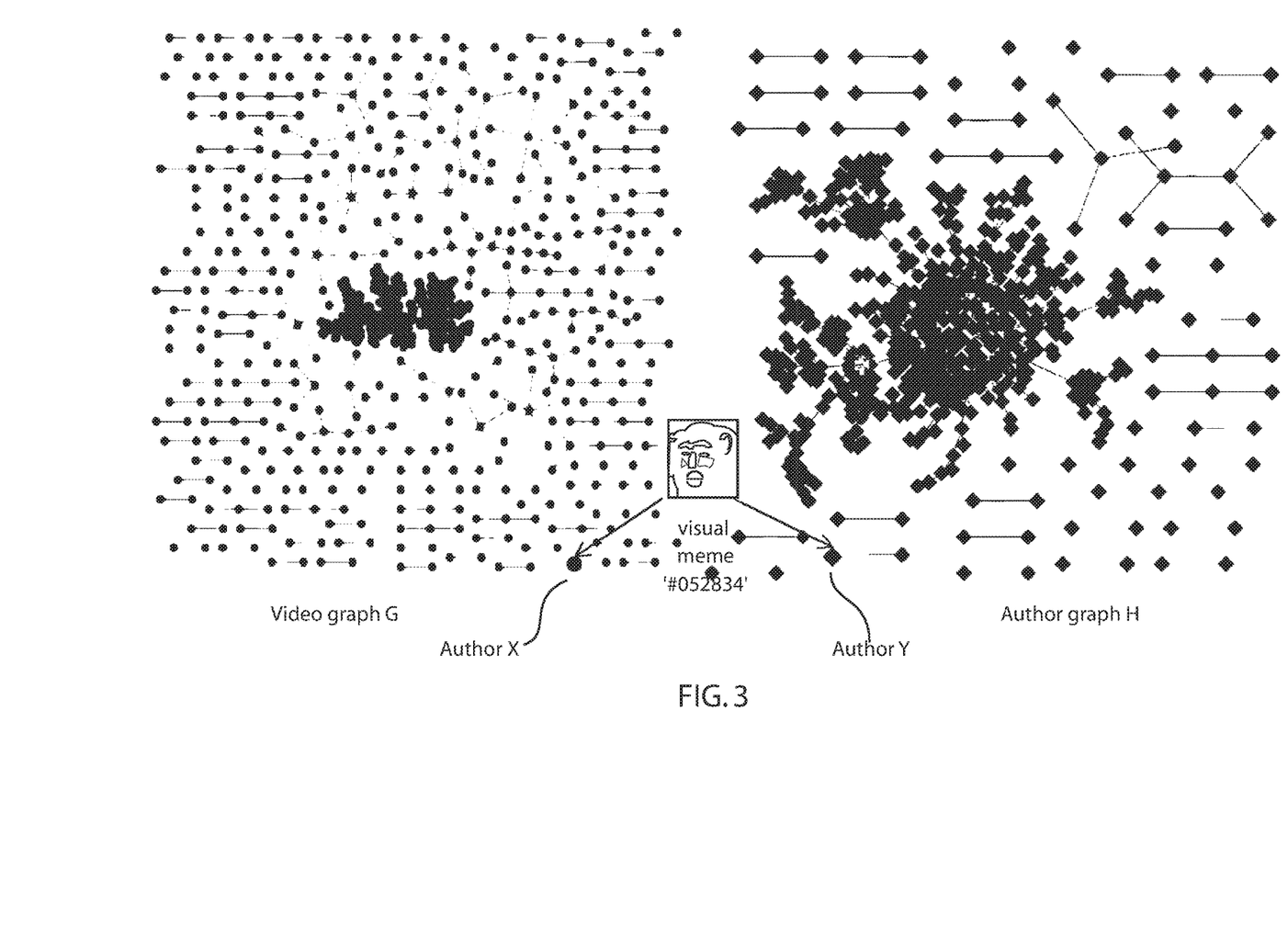
FIG. 3 shows a video graph and an author graph showing meme relationships in accordance with the present principles.

Referring to FIG. 3, meme graphs and influence scores for content and authors are illustratively shown (see also block 112). Two graphs are constructed over the videos $\mathcal{D}$ and the authors $\mathcal{A}$, respectively. The graphs reveal the overall content structure, and propose a diffusion influence measure to quantify the importance of nodes. We define the video graph G=$\{\mathcal{D},\mathcal{E}_G\}$ with the video documents $\mathcal{D}$ as nodes. There is a directed edge $e_{ij}$, if documents $d_i$ and $d_j$ share at least one visual meme, and $d_i$ precedes $d_j$ in time. The presence of $e_{ij}$ merely represents a probability that $d_j$ can be influenced by $d_i$, when there is no further evidence (from the video collection alone) whether or not this has indeed happened. We denote the number of shared visual memes as $v_{ij}=\|d_i \cap d_j\|$. The edge weights $\omega_{ij}$ can relate to $v_{ij}$ and the time elapsed between the posting time of the two videos, denoted as $\Delta t_{ji}=t(d_j)-t(d_i)$. Here, we adopt two simple recipes for computing $\omega$, the first one (Equation 1) assigns a weight proportional to the number of common memes, and the second one (Equation 2) further scales the weight by a power-law memory factor. The power law decay is similar to known behaviors and our own content freshness study, while the first model can accommodate multiple modes in $\Delta t$ for content re-mixing.

$$\omega_{ij}^* \propto v_{ij}, j \in \mathcal{E}_G \tag{1}$$

$$w'_{ij} \propto v_{ij} \Delta t_{ji}^\eta \tag{2}$$

The constant factors can be omitted without loss of generality. We use $\eta$ estimated from experimentation. Other factors such as the popularity index (number of views, rating score, etc.) can also be taken into account, although they are also inconclusive unless we have evidence about a true source that a meme shot comes from.

The author graph H=$\{\mathcal{A},\mathcal{E}_H\}$ is defined with the set of distinct users as nodes, and the common visual memes posted by a pair of users $a_r$ and $a_s$ as edges. We compute the edge weights $\tau_{rs}$ as the aggregation of those edges in the video graph G that go between documents authored by $a_r$ and $a_s$.

$$\tau_{rs} = \Sigma_{\{i,a(d_i)=a_r\}} \Sigma_{\{j,a(d_j)=a_s\}} \omega_{ij}, r,s \in \mathcal{A}\ i,j \in \mathcal{D} \quad (3)$$

Note that graph H is undirected and time-insensitive, since authors often repost memes from each other. Also, we look at the accumulated interaction in time since most authors post no more than a handful of videos, and there may not be enough data to estimate instantaneous activities.

In FIG. 3, an example of video G and author H graphs generated over a dataset are illustratively shown. Note that each meme induces a complete diffusion tree in video graph G, and a clique in graph H. We show all nodes (videos, authors) that have a connection, and a subset of the edges, computed using a minimum spanning tree algorithm to avoid cluttering the display. We can see that there is one densely connected topic community in each graph, with a number of smaller groups in the periphery. Note that the author graph H tends to have fewer isolated components, since aggregating over videos from the same authors lessens the effect of meme clusters that were split apart, and is more robust to incidental off-topic posting from each author.

Memes tend to connect content and people that contribute to the same topic in an event, and here we examine the converse—outliers in both graphs. For example, visual meme #052834 is shared only between two videos, from two authors X and Y who only share this meme with each other.

Diffusion influence index: A diffusion influence index is defined to identify the most influential content and topic-hubs in a social network. This is done via computing the in- and out-degrees of a node i in a diffusion subgraph induced by visual meme $w_v$ in video graph G. The subgraph induced by $w_v$ includes all video nodes that have meme $w_v$, $\mathcal{D}_{w_v} = \{d_j = \{\mathcal{D}, s.t. w_v \in d_j\}\}$ as well as the edges within this subset of nodes. Note that the subgraph edge weighting factor v is set to one since it concerns a single meme. The in-degree and out-degree of node i in $\mathcal{D}_{w_v}$ are computed as follows:

$$\zeta_{i,w_v}^{in} = \Sigma_j I\{i,j \in \mathcal{D}_{w_v}(j,i) \in \mathcal{E}_G\}$$

$$\zeta_{i,w_v}^{out} = \Sigma_j \{i,j \in \mathcal{D}_{w_v}(i,j) \in \mathcal{E}_G\} \quad (4)$$

I{•} is the indicator function that takes a value of 1 when its argument is true, and 0 otherwise. Time-varying and node-varying weights can also be easily added. Intuitively, $\zeta_i^{in}$ is the number of videos with meme $w_v$ that precede video $d_i$ (potential sources), and $\zeta_i^{out}$ is the number of videos that posted $w_v$ after $d_i$ (potential followers). The video influence index $\chi_i$ is defined as the ratio of out-degree over in-degree, aggregated over all meme subgraphs (Equation 5), and the author influence index $\chi_r$ is obtained by aggregating $\chi_i$ over all videos from author $a_r$ (Equation 6).

$$\chi_i = \sum_{w_v} \frac{\zeta_{i,w_v}^{in}}{1 + \zeta_{i,w_v}^{out}} \quad (5)$$

$$\hat{\chi}_r = \sum_{\{i,a(d_i)=a_r\}} \chi_i, \quad (6)$$

$$\bar{\chi}_r = \frac{\hat{\chi}_r}{\Sigma_i I\{a(d_i) = a_r\}}$$

Note that the "1" in the denominator is a smoothing factor to account for video $d_i$ itself. The normalized author influence index $\bar{\chi}_r$ is the un-normalized counterpart divided by the number of videos this author posted, which can also be interpreted as an average video influence per author.

Topics across memes and words: Seeing the structures of large data collections both locally and globally is one long-standing challenge. A holistic graph visualization presented above is very useful for examining local structures, but is difficult to scale without an advanced interactive visualization and exploration tools. Topic models may be built on video collections, over both the visual memes and available text descriptions, to model global structures and to facilitate applications such as annotation and retrieval.

Topic models are useful tools for clustering and summarizing large document collections. A set of topics $z=1, \ldots, K$ are learned on the multimedia corpus $\mathcal{D} = \{d_m, m=1, \ldots, M\}$ using latent Dirichlet allocation (LDA). LDA models each document as a mixture of topics modeled as a document-dependent Dirichlet distribution, each topic drawn from the resulting multi-nomial, and each word drawn from a topic-dependent multi-nomial distribution. We obtain the following quantities from the LDA model: 1) The conditional distribution of word given topic $\Phi$ for each element, $\Phi_{k,i} = p(w=v_i|z=k)$. 2) The Dirichlet parameters of topics given a document $\Theta$, which can be normalized to give expectations of topic posterior for a document, $\hat{\Theta}_{m,k} = p(z=k|d_m)$. The estimation and inference may be conducted with variational expectation maximization (EM) or other methods.

We derive Cross-modal matching (CM²) methods on top of LDA modeling to automatically explain the meanings of visual memes. Not all words are universally known in multimedia documents—new words or acronyms (e.g. H1N1) can emerge in social media. Some words and names may be relatively unknown before a certain event (e.g. entekhabat, "election" in Persian), and iconic visual memes may appear without clear context of emergence. This can be formulated as a cross-modal matching problem, and can aim to estimate how well a textual or visual word (candidate result $w_r$) can explain another word (query $w_q$). This is achieved by estimating the conditional probability of seeing $w_r$ given that $w_q$ is in the document, i.e., $p(w_r|w_q,D)$ where $w_r, w_q \in \{\mathcal{V}_t\}$. We call this estimation process Cross-Modal-Matching (CM²), and employ its application for content annotation and retrieval.

Figure 4:
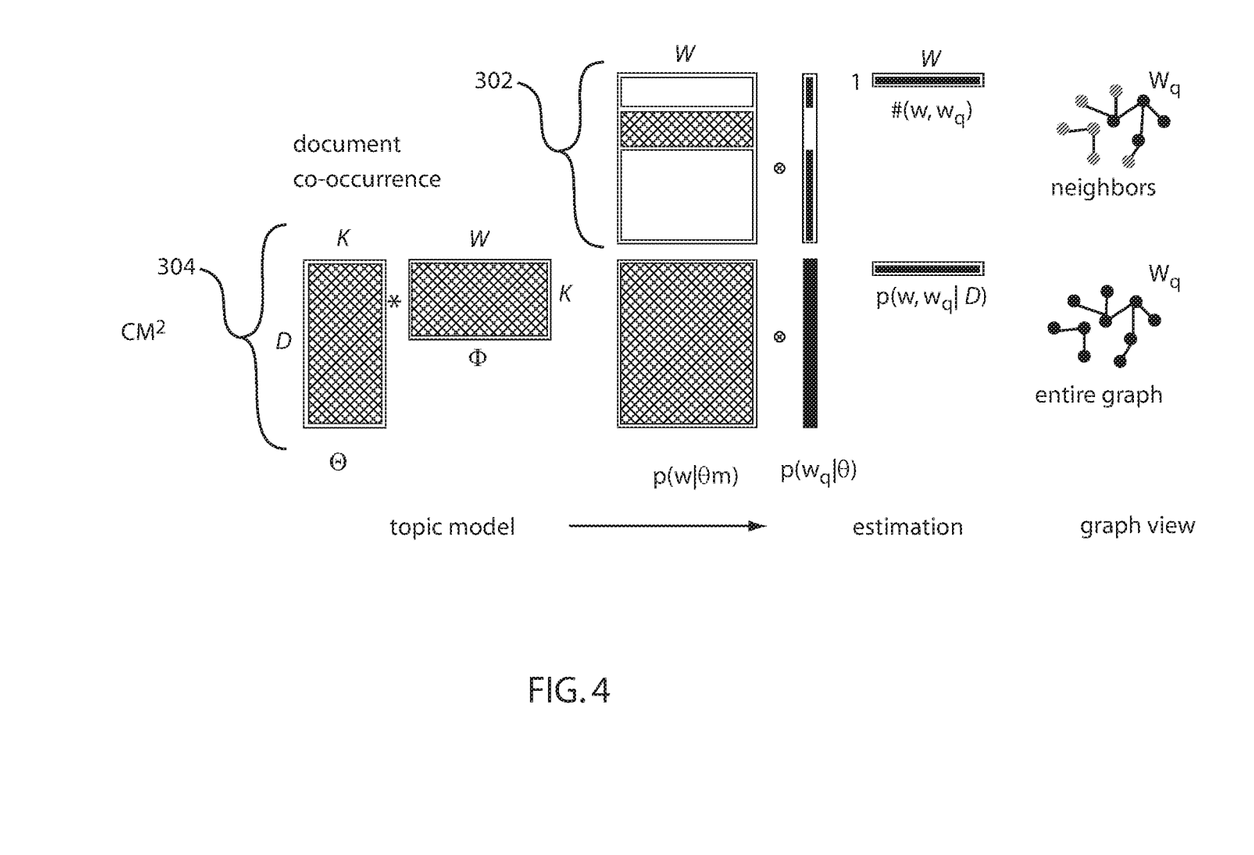
FIG. 4 is a diagram showing a relationship between co-occurrence counting and $CM^2$ in accordance with one embodiment.

Referring to FIG. 4, a derivation sketch for CM² is illustratively shown and depicts co-occurrence counting and CM². D, K, W, and 1 denote matrix dimensions, * denotes matrix multiplication and ∃ denotes inner product. Under the context of document collection D and the topic model $\{\Theta, \Phi\}$:

$$p(w_r | w_q, D) \propto p(w_r | w_q, D) \quad (7)$$

$$= \sum_m p(w_r, w_q | \theta_m) p(\theta_m | D_m) \quad (8)$$

$$= \sum_m p(w_r | \theta_m) p(w_q | \theta_m) \quad (9)$$

Equation 7 follows from the fact that the scaling factor $p(w_q|D)$ is a constant for a given query $w_q$ and collection D; Equation 8 holds since we can use an empirical sum over document collection in place of integration over all possible values of $\theta$; Equation 9 approximates the point posterior probability of the Dirichlet parameter $\theta_m$ as 1. This model assumes conditional independence of $w_r$, $w_q$ with $D_m$ given $\theta_m$, as well as that of $w_r$ and $w_q$ given $\theta_m$, following from the LDA generative process.

Note that the two terms in Equation 9 are symmetric, and can be simply written out below by integrating over all topics z. We use $X_{i,j}$ to denote the (i,j)-th element in matrix X, is obtained by matrix multiplication.

$$p(w_q \mid \theta_m) = \sum_{z_q} p(w_q \mid z_q) p(z_q \mid \theta_m) = (\Phi\Theta)_{m,q} \quad (10)$$

$$p(w_r \mid \theta_m) = \sum_{z_r} p(w_r \mid z_r) p(z_r \mid \theta_m) = (\Phi\Theta)_{m,r}$$

Examining the estimation equations (7)-(10), we note that $CM^2$ can be interpreted as a soft co-occurrence measure for $w_r$, $w_q$, over the entire document collection with the topic model. FIG. 4 illustrates this connection. One baseline method is co-occurrence 302, where the score of $w_r$ is obtained by counting the number of times that $w_r$ is seen in the same document as $w_q$. The $CM^2$ model 304, on the other hand, first computes a "smoothed" count of $w_r$ over document D by weighting the document-topic posterior $\Theta$ with the $r^{th}$ column of word-topic posterior $\Phi$. The "smoothed" count is then weighted by the weights of $w_q$. In a sense, co-occurrence counting is a special case, where $p(w_r|\theta_m)$ uses the counts from the subset of documents with $w_q$ (with weight 1).

It is easy to connect this interpretation with the graph view when $w_q$ is a visual meme. Here, document co-occurrence (302) counts over all directly connected nodes (neighbors in the graph view) via $w_q$, and $CM^2$ (304) accumulates over an entire graph (entire graph in the graph view) with document- and topic-dependent weights. We can restrict this "soft counting" to only part of the graph (e.g., via connected components for a cleaner result). Here, $CM^2$ also connects to known network-based approaches such as, e.g., the known HITS algorithm.

$CM^2$ has several applications depending on the choice of $w_q$ and $w_r$. Such as (1) Visual Meme annotation, in context. We use visual memes as queries, $w_q \in \mathcal{V}_t$, and return the top entries of $w_r \in \mathcal{V}_t \cup \mathcal{V}_t$, sorted by $p(w_r|w_q,D)$. The motivation of this task for event monitoring is that the keywords are often specialized subjective, semantic, and non-visual, e.g., freedom. (2) Keyword illustration. We can illustrate a keyword (e.g., H1N1 (as in the flu virus)) with a set of most-related images. We take $w_q \in \mathcal{V}_t$, and yield the top entries of $w_r \in \mathcal{V}_t$, sorted by $p(w_r|w_q,D)$. We focus on application (1) for illustrative purposes.

In block 114 of FIG. 1, dataset summary, observation and applications are employed. Using the querying-collection and extraction procedures in illustrative examples, we collected more than 200K videos over 22 topics in a three-month period during 2009.

Figure 5A:
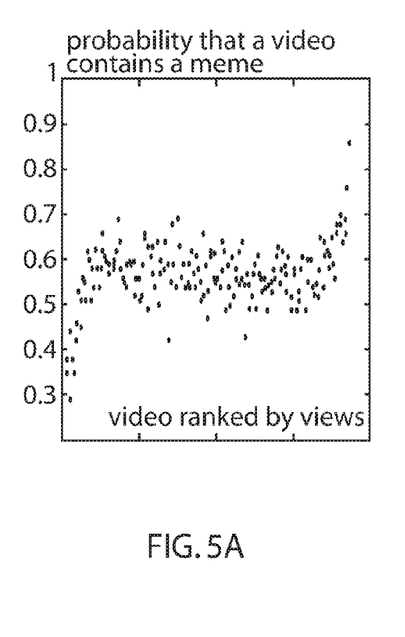
FIGS. 5A-5C show graphs of illustrative analysis performed using visual memes.

Content freshness: A "memory experiment" was conducted to evaluate the age of the returned videos for a query, i.e., content freshness. This can be used to determine the extent of influence on video remixing from past entries. We ran the querying and content extraction during one single day, $d_0$=2010-04-04, across a set of seven diverse topics spanning environment, health, economics and international politics. FIG. 5A shows the unique video entries returned for each topic. An interval between the video's upload date and do, averaged over multiple topics is employed as an age. We note that the content volume is significant for any of these topics (1800-6500), and that the age distribution is approximately a power law. Illustratively, we can obtain a power-law regression fit for the content volume versus age: $f(d)=\alpha dt^{\eta} \sim 0.0581 t^{-0.7654}$. The constant $\eta=-0.7654$ represents a YouTube™ "memory" factor that affects the temporal influence of videos for meme creation. This is used to scale graph weights as explained above (e.g., Eqs. 1 and 2).

Meme detection performance: The performance of the visual near-duplicate detection method described herein was evaluated. Multiple versions of near-duplicate detection runs were run, the union of detected near-duplicates was taken, and a sample of the equivalence classes was manually reviewed to explicitly mark correct and incorrect near-duplicates, especially near the decision boundary. In some cases, manually augmentation was performed on the detected near-duplicate sets by performing visual content-based queries and manual thresholding of the results. Overall, we collected approximately 15,000 examples of positive near-duplicate pairs, and another 25,000 examples of non-near-duplicate pairs, which serves as a test set for evaluation purposes.

Figure 5B:
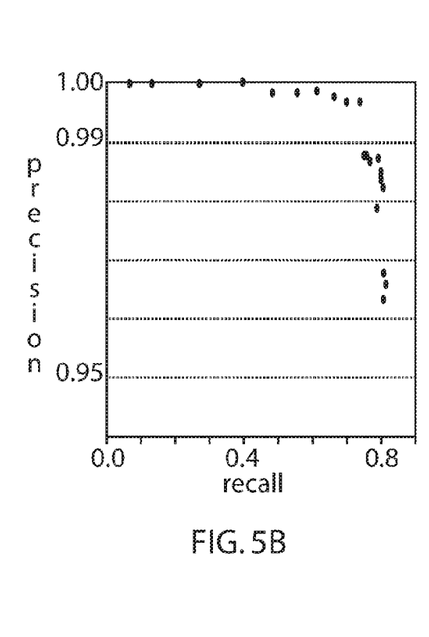

When measuring performance, the near-duplicate equivalence classes are computed as described, ignoring any pairs of frames for which we do not have either positive or negative ground-truth, and calculating precision and recall on the remaining edges. The results are shown on FIG. 5B for varying values of the threshold parameter, $\tau$. We note that the performance is generally quite high, including several notable operating points on the precision-recall curve. For a low false alarm run, we can obtain 99.7% precision with 73.5% recall, or for a more balanced run, we can obtain 98.2% precision with 80.1% recall, which also produces the maximum harmonic mean (F1) score of 0.88. For the remaining experiments and datasets, we use $\tau=11.5$, which produces the highest recall rate of 80.7% with precision of 96.6% on this set.

Figure 5C:
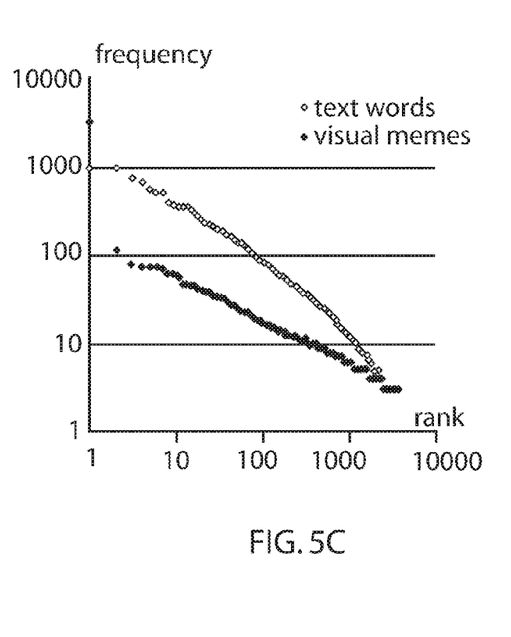

Meme frequency distribution: In addition to detection performance, we evaluate the quality of detected memes by studying their frequency distribution and comparing the meme frequency distribution with the word frequency distribution. FIG. 5C shows the textual word and visual meme frequencies shown in a log-log scale. Performing a regression fit, we obtain the following Zipf's power law distributions:

$$f(w_t) \propto r^{1.102}; f(w_v) \propto r^{1.959}$$

The exponent s for words in the title and description is close to that of English words (~1.0). For visual memes, s=1.959, suggesting that the diversity of visual memes is less than that of words at the lower-frequency end. Still, FIG. 5C validates that the visual memes form a vocabulary with a "proper" distribution and can be used as visual words for topic modeling, jointly with the textual words. It should be understood that the relationships, observation and applications described herein are for illustrative purposes to demonstrate possible data analysis for a given topic and data collection. However, other observations, analyses and applications may be employed in accordance with the present principles.

Figure 6:
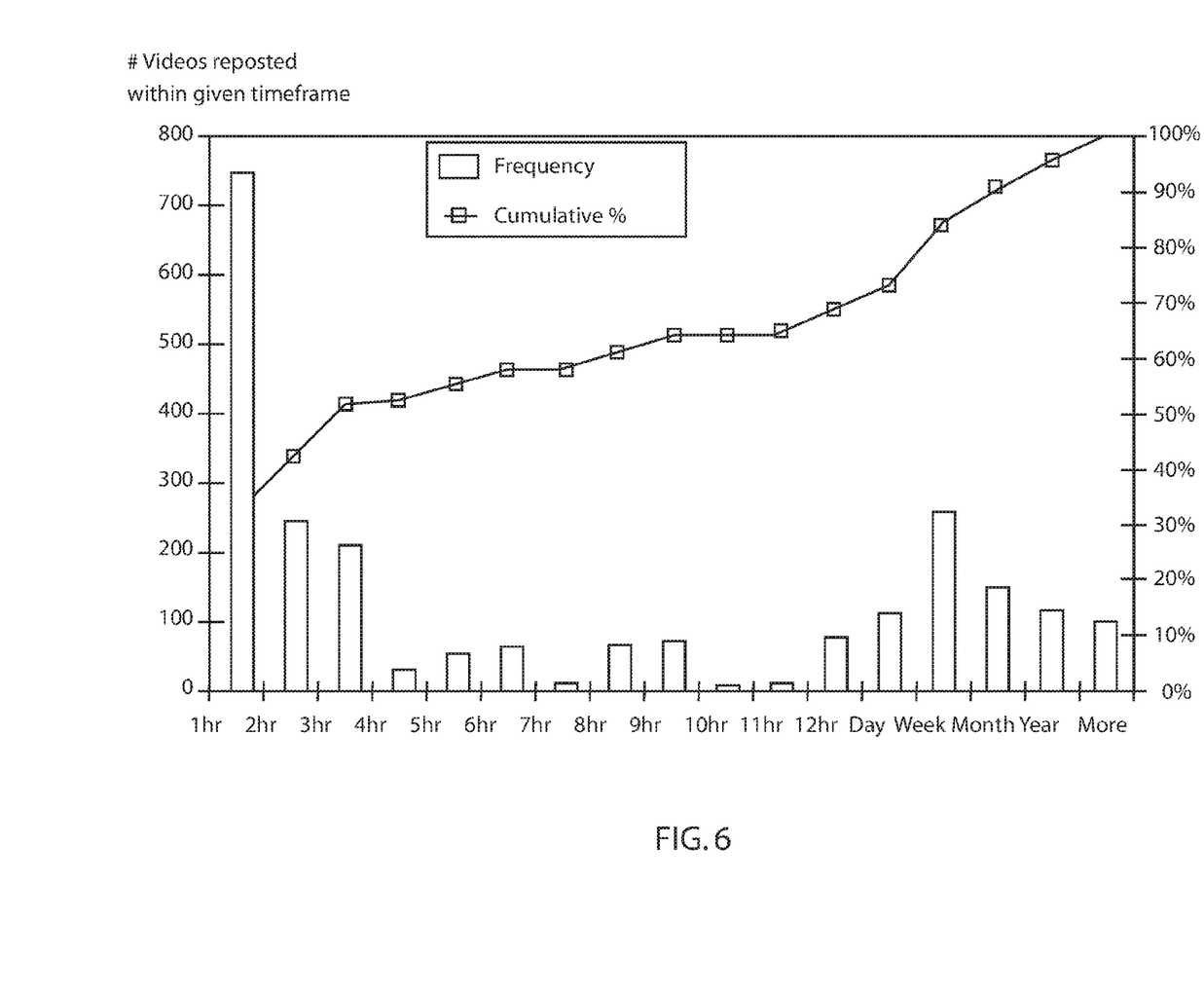
FIG. 6 is a histogram showing cumulative percentage of video memes re-posted by a second author per time interval for a data set.

Meme onset and reposting interval: FIG. 6 shows the expected time interval before a new visual meme is discovered and re-posted after its initial upload. The left y-axis shows a number of meme videos that were first reposted in a given time interval, and the right y-axis shows a cumulative percentage. The statistics are computed for a topic dataset, based on approximately 2300 meme videos that have at least 10 duplications by other authors. The results show that more than half of the memes are re-posted within 3 hours of their initial upload, and over 70% are re-posted the same day. The graph of FIG. 6 also shows a secondary peak at the granularity of a week.

Observations on meme graphs and topics: In one embodiment, we filter the set of memes from a detection system by removing those belonging to a single video or a single author. For a diffusion calculation, we do not consider memes that occurred less than 10 times, as they often tend to be pieces from larger meme clusters, which are incorrectly fragmented by our near-duplicate detection system. For topic modeling, we threshold the meme and word frequency so that we are left with about 1500 to 3000 visual words and about 2000 to 4000 text words.

Figure 7:
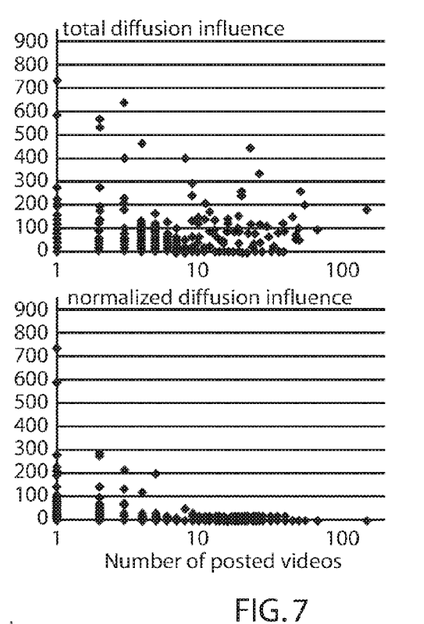
FIG. 7 are diagrams showing diffusion indices for total and normalized diffusion influence.

Referring to FIG. 7, a diffusion index graph for content and authors is illustratively shown. We compute the author-diffusion index according to Equation 6. We plot the total diffusion influence $\hat{\chi}_r$ and normalized index (over the number of videos containing memes) $\bar{\chi}_r$ versus "author productivity", i.e., number of videos. Two distinct types of contributors may include a "maven", who posts only a few videos which tend to be massively remixed and reposted. A second group can be dubbed "citizen buzz leaders", who tend to produce a large number of videos with high total diffusion factor, yet relatively low influence per video. One reason is that the contributors may be aggregating and come relatively late in the timeline. This is penalized by the influence factor, which includes a response metric such as view count or comment.

FIG. 7 shows a diffusion index scatter for total diffusion influence (top) and normalized diffusion influence (bottom). The few "infrequent but influential" posters are less active, and notably they all reposted an old video covering the topic. The total diffusion scatter includes the traditional media, most of which have a large number (>40) of videos with memes, as the videos seem to have driven most of the media content on this topic of international interest.

Figure 8:
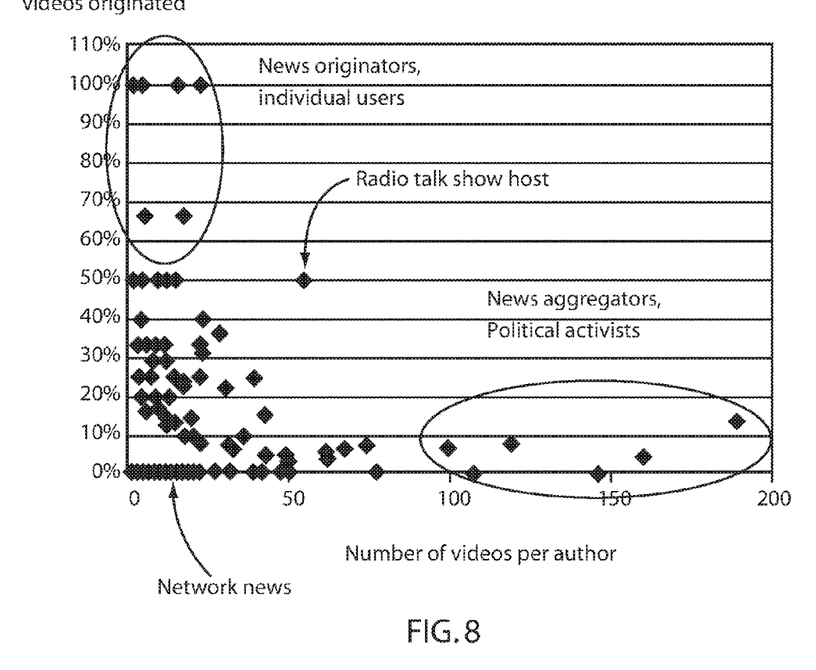
FIG. 8 is a diagram plotting fraction of videos originated versus number of videos originated to show content originators versus news aggregators.

Content originators and aggregators: The role of traditional media versus social media and citizen journalism can vary substantially across topics. The authors' diffusion score, and therefore overall influence, is only partially correlated to the number of videos they produce. In other words, an author can become influential by producing a small number of original videos that induce many follow-on memes (e.g., the "maven" user), or an author can become influential by discovering and re-posting many pieces of other people's content early in the meme lifecycle. Both types of authors have an important role in the overall evolution and influence of a piece of content. We call these hypothetical author types content originators and content aggregators, and we attempt to discriminate between them using an author originality index, defined as the fraction of video memes first originated by a given author over the total number of video memes the author participates in (originated or re-posted). FIG. 8 shows a fraction of videos originated in plotted against number of videos. As can be seen, network news posts the fewest videos but may be the most influential source of information. Individuals, activists and advocates seem to post more videos. FIG. 8 is shown for illustrative purposes. Other plots and graphs are also contemplated and may be employed in accordance with the present principles.

To compute the author originality index, we consider all meme clusters on a dataset. We exclude clusters without a clear originator (i.e., when multiple videos including the same meme are posted within the first hour the meme is observed). This excludes some legitimate memes from the analysis but reduces noise due to incorrect meme cluster fragmentation. The remaining memes are used to tally up votes for each author in terms of how many times they were first to post a meme versus they re-posted a known meme. In our example, this produced a set of "originators" and "aggregators". Author originality index may be compared against author productivity to identify content originators and content aggregator users based on this index.

Observations on topics characterization: An LDA model is based on a joint vocabulary of words and memes, constructed using a threshold on the term frequency in the collection. A joint vocabulary size was around 6000, and the number of topics was set to be 25 or 30—by trial and error, although cross-validation could be used. We use the term-topic probabilities p(w|z) to label a topic, using both text words and visual memes. We adopt a term frequency-inverse document frequency (tf-idf) like re-weighting scheme to come up with term score $\beta_{k,v}$ for ranking words and memes. This is to suppress very popular words and yet not overly favor rare words and memes.

$$\hat{\beta}_{k,v} = p(w_v | z_k) \log \left( \frac{p(w_v | z_k)}{\prod_{j=1}^{K} p(w_v | z_j)^{1/k}} \right) \quad (11)$$

Meme in context: We examine the CM$^2$ model for retrieving memes in context. Here we consider using one visual meme as the query (while multi-meme query can be easily accommodated), and retrieve the top-ranked words and memes using scores computed with Equation 7. We limit the return to at least 3 words and up to 10 memes, and look at the memes in comparison with those retrieved by top co-occurrence.

The temporal evolution of a meme and a topic may be determined. The meme evolution clearly points out a source video, it also reveals that there are multiple waves of remixes and re-postings around the same theme. The topic evolutions, on the other hand, segment out sub-events from the broader unfolding of many themes.

A social network measurement study may include varying methods and objectives. Random or category-specific, content acquisition helps characterize the entire social network and observes collective behavior and content distributions. Continuous querying and monitoring on social streams is topic-specific, and visual memes reveal the implicit common interest among a large user group who tend to be personally aware. We also note that the originators and disseminators defined in this study can be seen as an implicit version of the well-known authorities and hubs.

The use of visual memes for tracking and monitoring of real-world events has been provided in accordance with the present principles. An illustrative large-scale event-based social video monitoring and analysis system has been described to demonstrate a scalable method for extracting visual memes with high accuracy (e.g., in an example case, 98% precision and 80% recall). Formal models have been developed for leveraging visual meme networks and multi-modal topics. A number of observations have been extracted from several large-scale event datasets. Illustratively, we note that in one case between 50%~70% of the videos in typical event collections are not original; most videos that become memes are discovered and reposted in a matter of hours (e.g., 30% in the first hour and over 70% within the first day). Meme volume correlates well to real-world events and can be used as indicator of importance for events, content, or people. We can identify and quantitatively measure the influence of video content originators and disseminators in the community, and the role of traditional news media and citizen journalists can vary dramatically from event to event.

Figure 9:
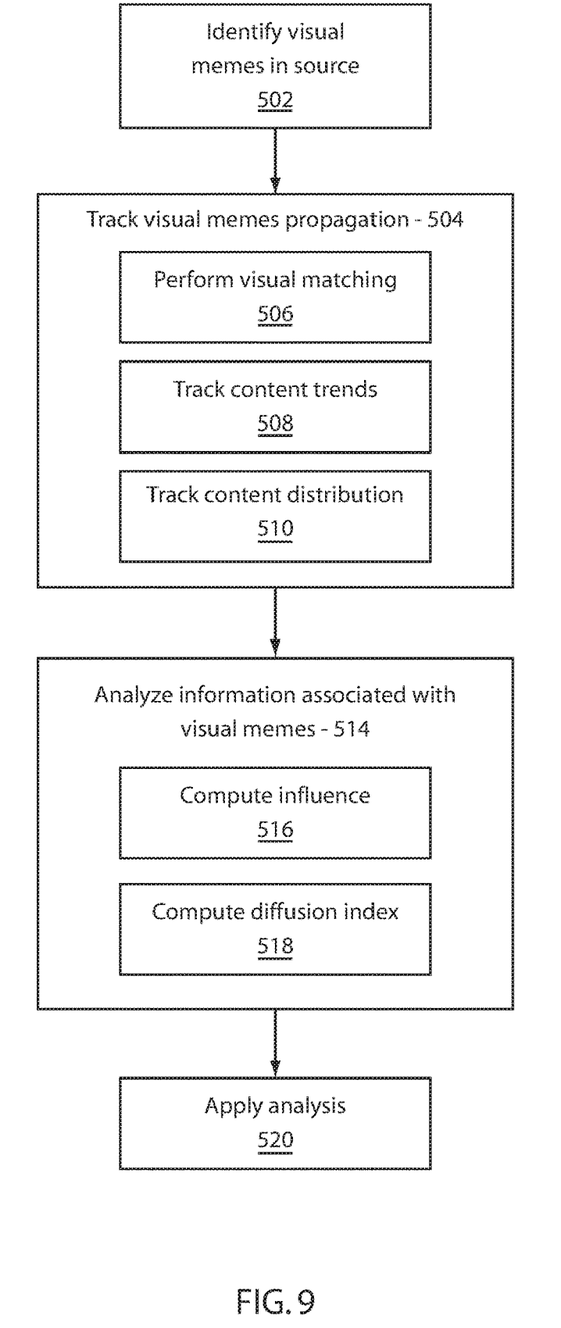
FIG. 9 is a block/flow diagram showing a system/method for tracking and analysis of visual memes in accordance with another illustrative embodiment.

Referring to FIG. 9, a system/method for analyzing visual memes is illustratively shown. In block 502, visual memes are identified in a data stream of other data source (library, repository, web site, etc.). The visual memes identified are those associated with a topic or query. In block 504, the visual memes propagated over time are tracked to extract information associated with the identified visual meme. The information may include number of views, the number of posting and reposting, frequency of reposting, etc.

In block 506, tracking may include performing visual feature matching including employing one or more of color-correlograms, local interest points, thumbnail vectors or other techniques. The matching may include matching visual memes using a high-dimensional indexing method, such as, e.g., a kd-tree, a k-means tree, a ball tree and/or an approximate nearest-neighbor method. In block 508, content trends may be tracked using a multimodal topic analysis, such as $CM^2$, co-occurrence, etc. or combinations thereof. In block 510, content distribution may be tracked using topic graphs created on visual memes. In block 514, the information associated with the visual meme is analyzed to determine trends for the visual memes including identifying relative importance of content and relative influence of users. The relative importance may be a function of the number or frequency of the visual memes, but may also consider who the poster or reposter is (influence), among other things. The relative influence may be based on the source and the source's posting history, etc. In block 516, an influence score may be determined for pieces of content based on meme graphs constructed on at least one of authors and content. The influence score may be determined by identifying influential users based on timing and popularity of posted memes. In block 518, influential users may be identified based on a diffusion index on meme graphs constructed on one of authors and content.

In block 520, the visual memes and their related information are applied to solve a problem, characterize data, discover a data source, etc. Visual memes may be automatically tagged with words in text or other memes that were derived from one or more of graph and topic analyses. Applications for employing visual meme analysis may include applications in advertising, marketing, public relations, intelligence monitoring/security, or any other field.

Figure 10:
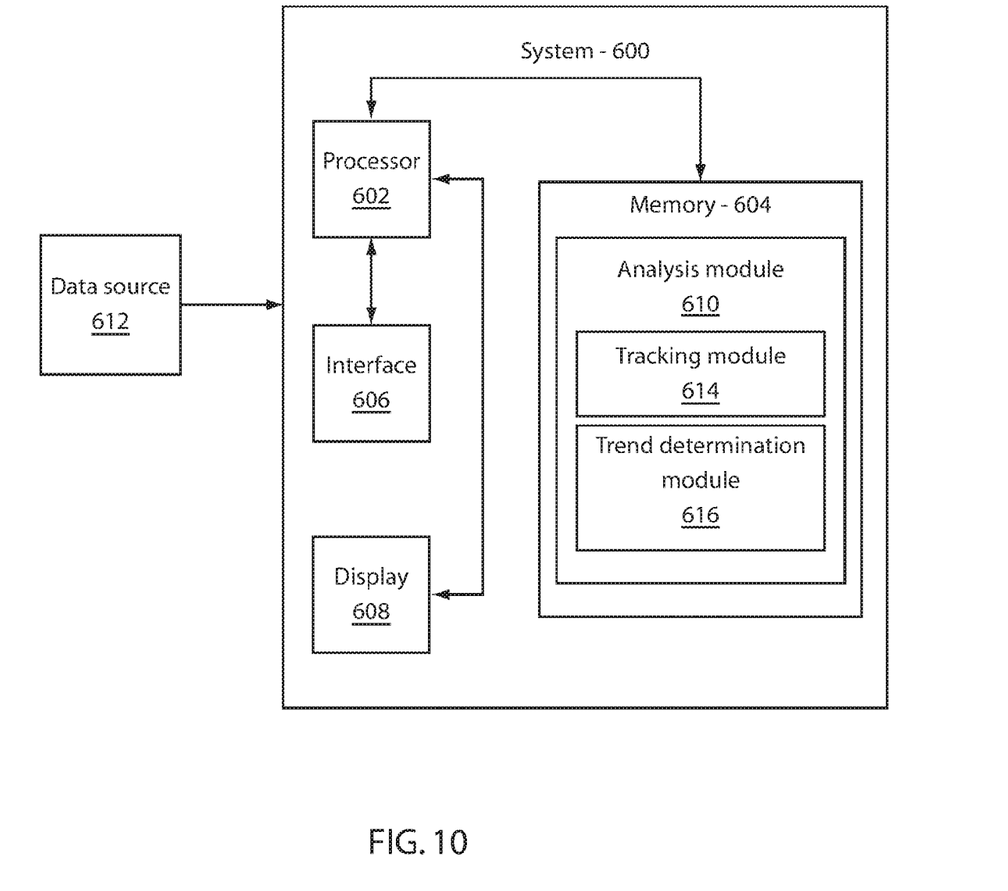
FIG. 10 is a block diagram showing a system for tracking and analysis of visual memes in accordance with an illustrative embodiment.

Referring to FIG. 10, a system 600 for analyzing visual memes is illustratively shown. System 600 includes a processor 602, a memory 604, a user interface 606, and a display 608. The memory 604 is coupled to the processor 602 and stores an analysis module 610. The analysis module 610 is configured to identify and track visual memes associated with at least one topic in a data source 612. The data source 612 may include a library, data stream or streams, a web site or other video repository (e.g., YouTube™). The analysis module 610 includes a tracking module 614, which is configured to collect information associated with identified visual memes as the visual memes are propagated over time. A trend determination module 616 is configured to discover trends by analyzing the information associated with the visual meme and identify relative importance of content and relative influence of users. Trend determination module 616 may further include any data or statistical analysis tools or applications which may be useful in analyzing visual memes.

The tracking module 614 performs visual feature matching by employing one or more of color-correlograms, local interest points and thumbnail vectors, and preferably includes a high-dimensional indexing method for matching visual memes. The high-dimensional indexing method may include one or more of a kd-tree, a k-means tree, a ball tree and an approximate nearest-neighbor method. The tracking module 614 may perform a multimodal topic analysis for tracking content trends. The tracking module 614 tracks content distribution using topic graphs created on visual memes.

The trend determination module 616 may compute an influence score for pieces of content based on meme graphs constructed on at least one of authors and content, and may compute a diffusion index on meme graphs constructed on one of authors and content for identifying influential users. System 600 may be employed to analyze visual memes for any number of applications, including, e.g., advertising, marketing, public relations, intelligence monitoring, etc.

Having described preferred embodiments of systems and methods for visual meme tracking for social media analysis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for visual meme tracking for social media analysis, comprising:
   identifying at least one visual meme from one or more social media platforms, the visual meme being non-textual and associated with at least one topic in a data source;
   tracking the at least one visual meme, propagated over time, the tracking including performing visual feature matching by extracting visual features associated with identified visual memes and modeling the identified visual memes as links in people-content networks and as words in multimedia collections, the visual features including one or more color-correlograms extracted from one or more normalized frames for determining a similarity metric; and
   analyzing, using a processor, the similarity metric and the visual features associated with the identified visual memes, the analyzing determining at least one of generation, propagation, and use of the identified memes, and further determining meanings of the identified visual memes using cross modal matching.

2. The method as recited in claim 1, wherein tracking includes performing visual feature matching including employing one or more visual features including one or more of color-correlograms, local interest points, and thumbnail vectors.

3. The method as recited in claim 1, wherein tracking includes both visual feature matching and temporal alignment.

4. The method as recited in claim 1, wherein tracking includes matching visual memes using a high-dimensional indexing method.

5. The method as recited in claim 4, wherein the high-dimensional indexing method includes one or more of a kd-tree, a k-means tree, ball tree, and an approximate nearest-neighbor method.

6. The method as recited in claim 1, wherein analyzing includes determining an influence score for pieces of content based on meme graphs constructed on at least one of authors and content.

7. The method as recited in claim 1, wherein analyzing includes identifying influential users based on a diffusion index on meme graphs constructed on one of authors and content.

8. The method as recited in claim 1, wherein tracking includes tracking content trends using a multimodal topic analysis.

9. The method as recited in claim 1, wherein tracking includes tracking a content distribution using topic graphs created on visual memes.

10. The method as recited in claim 1, wherein analyzing includes identifying influential users based on timing and popularity of posted memes.

11. The method as recited in claim 1, wherein analyzing include tagging the visual memes with other words in text or other memes derived from one or more of graph and topic analyses.

12. A computer readable storage medium comprising a computer readable program for visual meme tracking for social media analysis, wherein the computer readable program when executed on a computer causes the computer to perform the steps of:
identifying at least one visual meme from one or more social media platforms, the visual meme being non-textual and associated with at least one topic in a data source;
tracking the at least one visual meme, propagated over time, the tracking including performing visual feature matching by extracting visual features associated with identified visual memes and modeling the identified visual memes as links in people-content networks and as words in multimedia collections, the visual features including one or more color-correlograms extracted from one or more normalized frames for determining a similarity metric; and
analyzing, using a processor, the similarity metric and the visual features associated with the identified visual memes, the analyzing determining at least one of generation, propagation, and use of the identified memes, and further determining meanings of the identified visual memes using cross modal matching.

13. The computer readable storage medium as recited in claim 12, wherein tracking includes performing visual feature matching including employing one or more visual features.

14. The computer readable storage medium as recited in claim 12, wherein tracking includes both visual feature matching and temporal alignment.

15. The computer readable storage medium as recited in claim 12, wherein tracking includes matching visual memes using a high-dimensional indexing method.

16. The computer readable storage medium as recited in claim 12, wherein analyzing includes determining an influence score for pieces of content based on meme graphs constructed on at least one of authors and content.

17. The computer readable storage medium as recited in claim 12, wherein analyzing includes identifying influential users based on a diffusion index on meme graphs constructed on one of authors and content.

18. The computer readable storage medium as recited in claim 12, wherein tracking includes tracking content trends using a multimodal topic analysis.

19. The computer readable storage medium as recited in claim 12, wherein tracking includes tracking a content distribution using topic graphs created on visual memes.

20. A system for visual meme tracking for social media analysis, comprising:
a memory coupled to a processor, the memory storing an analysis module configured to identify and track visual memes from one or more social media platforms, the visual memes being non-textual and associated with at least one topic in a data source, the analysis module further comprising:
a tracking module configured to collect visual features associated with identified visual memes, the tracking module being further configured to perform visual feature matching by extracting visual features associated with identified visual memes as the visual memes are propagated over time, and to generate models for the identified visual memes as links in people-content networks and as words in multimedia collections, the visual features including one or more color-correlograms extracted from one or more normalized frames for determining a similarity metric; and
a trend determination module configured to discover trends by analyzing the similarity metric and the visual features associated with the visual meme to determine at least one of generation, propagation, and use of the identified memes, and further to determine meanings of the identified visual memes using cross modal matching.

* * * * *